J. JENSEN.
MACHINE ELEMENT.
APPLICATION FILED OCT. 4, 1918.
1,389,565.
Patented Aug. 30, 1921.
2 SHEETS—SHEET 2.
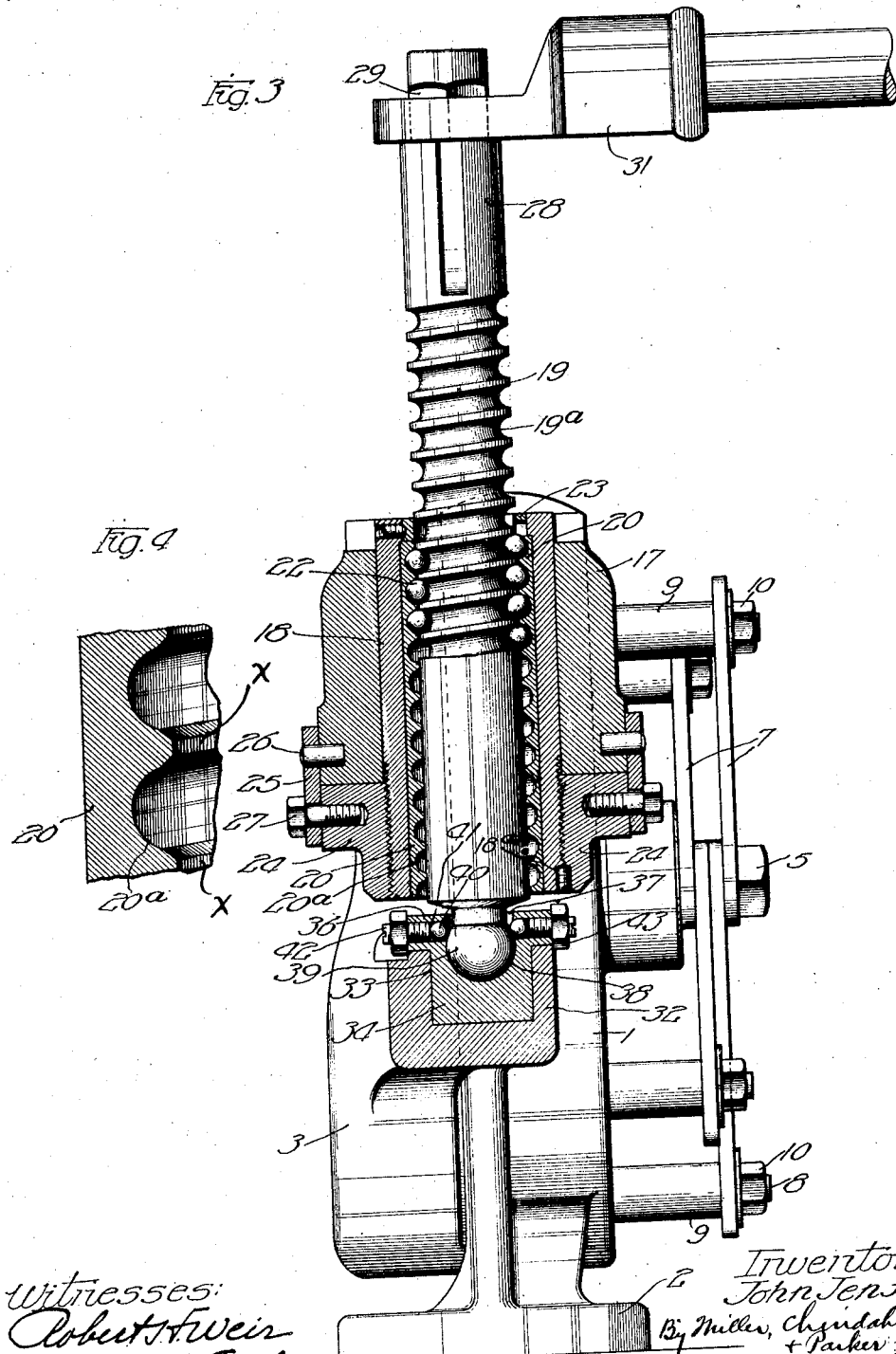

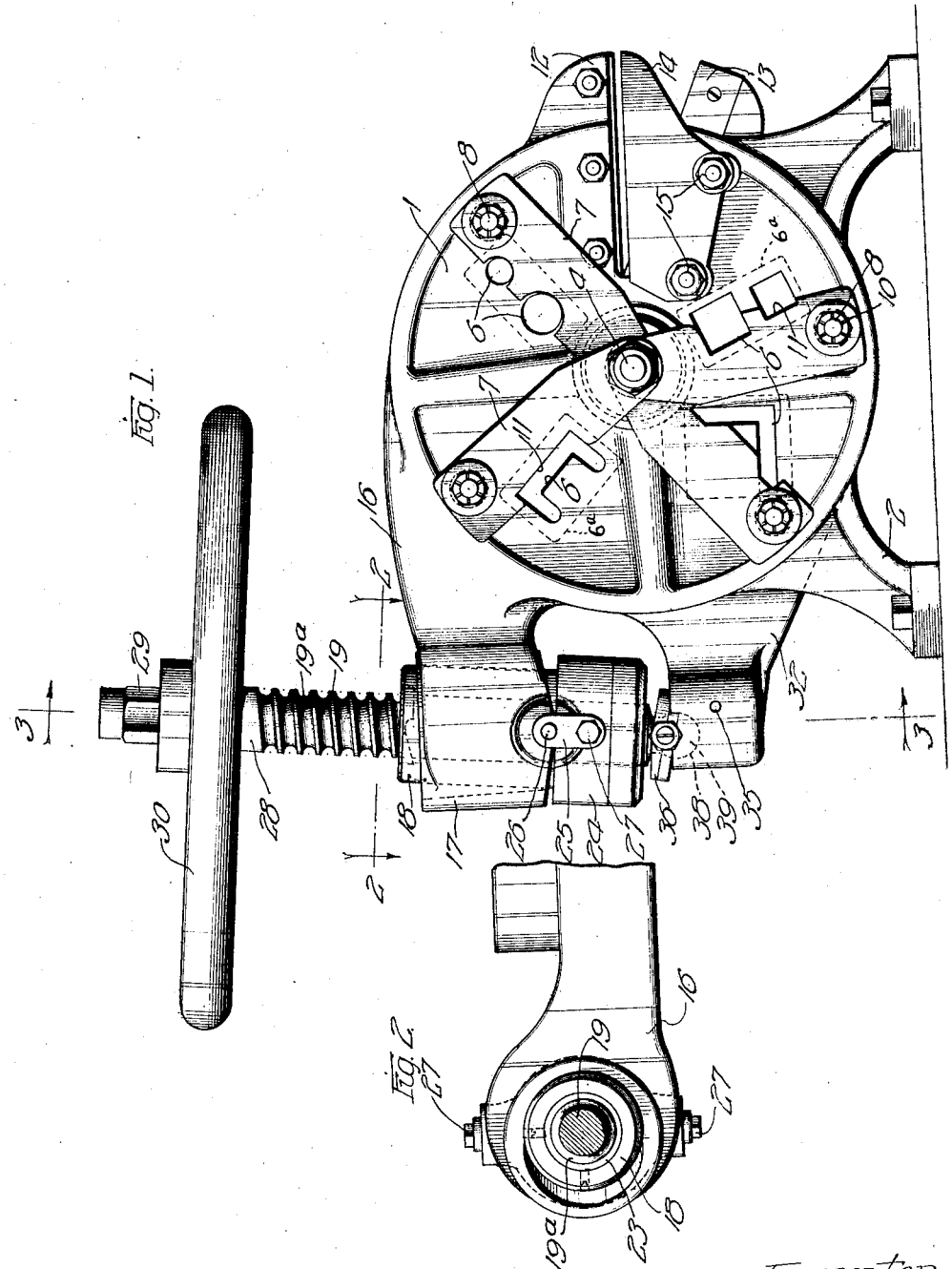

UNITED STATES PATENT OFFICE.

JOHN JENSEN, OF ROCKFORD, ILLINOIS, ASSIGNOR TO WHITNEY METAL TOOL COMPANY, OF ROCKFORD, ILLINOIS, A CORPORATION OF ILLINOIS.

MACHINE ELEMENT.

1,389,565.  Specification of Letters Patent.  Patented Aug. 30, 1921.

Application filed October 4, 1918. Serial No. 256,783.

*To all whom it may concern:*

Be it known that I, JOHN JENSEN, a citizen of the United States, residing at Rockford, in the county of Winnebago and State of Illinois, have invented certain new and useful Improvements in Machine Elements, of which the following is a specification.

This invention relates to anti-friction screw gearing adapted for heavy duty, as in the shearing and punching of metal sheets and bars.

In Patent No. 975,591, granted November 15, 1910, William A. Whitney, is shown a punch comprising a bushing, a spindle extending through the bushing, the bushing and the spindle being helically grooved, a series of balls in said grooves, and a cylindrical spacer or retainer for the balls, said retainer being interposed between the bushing and the spindle and provided with holes for receiving the balls. The grooves in the bushing and the spindle are longer than the series of balls, so that the series of balls rotates and moves longitudinally as a body or unit.

Among the many uses of punches and shears of the type shown in said Whitney patent is the shearing and punching of metal in connection with the erection of buildings. When employed in and upon buildings under construction, the tools receive extremely rough usage, and lubrication of the tools is very apt to be neglected. The retainer being necessarily formed of thin metal, it is subject to considerable wear under the most favorable conditions, the ball-receiving holes in the retainer becoming elongated as they wear and thus failing in their function of keeping the balls properly spaced apart. When lubrication is neglected, such wear is greatly increased, the holes frequently merging into one another. If the retainer sticks in the screw-threaded bushing so as to become immovable or difficulty movable, the tool must be repaired or discarded. Even when the retainer is made of the least practicable thickness, it nevertheless serves to space the spindle and the screw-threaded bushing apart and thus diminishes the extent of bearing surface between the balls and said bushing and spindle.

The primary object of this invention, therefore, is to produce a mechanism of the general type shown in said Whitney patent, which shall be free from the objectionable features incident to the use of a retainer or spacer.

In the accompanying drawings, Figure 1 is a side elevation of a shear embodying the features of my invention. Fig. 2 is a fragmental horizontal sectional view taken on line 2—2 of Fig. 1. Fig. 3 is a vertical sectional view taken in the plane of line 3—3 of Fig. 1, but on an enlarged scale. Fig. 4 is a fragmentary sectional view taken through the bearing bushing to show a section of the ball groove on an enlarged scale.

The embodiment herein shown of my invention comprises a generally circular body 1 having feet 2 by means of which the machine may be secured to the floor or any other suitable support. Pivotally supported upon the body 1 is a disk 3. The disk 3 is secured to the body 1 by means of a central pivot bolt 4 having a nut 5 upon its ends.

The body 1 and the disk 3 are provided with openings 6 through which a rod or bar may be passed, and adjacent said openings the body and disk are provided with shear plates 6ª arranged to coact in the shearing operation. These openings are of various sizes and shapes in order to receive bars and rods of various cross-sectional dimension and forms. Such rods or bars extending through the openings 6 may be sheared by pivotally moving the disk 3 to move the opening therein out of register with the opening in the body 1. Preferably bearing members 7 are provided on the body 1 to hold the rods or bars being sheared in position during the shearing operation. These members 7 are in the form of plates or bars mounted at one end on the bolt 4 and at their opposite ends upon stud bolts 8 carried by the body 1. The bolt 4 is extended to accommodate the members 7, and the bolts 8 carry spacing sleeves 9 and nuts 10 whereby the members are supported at spaced distances from the body 1. In order to more firmly hold the work against movement, the members 7 may also be provided with notches 11 of the proper shape.

For the shearing of plates or relatively thin bars, I provide a shear comprising blades 12 and 13 secured to the body 1 and the disk 3, respectively. For the purpose of preventing a deflection of the work being sheared, the body may be provided with a bearing member 14 in the form of a plate secured to the body at the side opposite the shear blade 12 as by means of bolts 15.

The means for pivotally moving the disk 3 will next be described. On the body 1 substantially diametrically opposite the shearing blades 12 and 13, is an arm 16 having a tubular boss 17. Carried by this boss is a tubular member 18, through which extends a spindle 19. The member 18 is provided with a bushing 20 having an internal spiral groove $20^a$ extending throughout its length to allow the vertical movement of the spindle. The latter has an external spiral groove $19^a$ of a length substantially equal to that of the groove $20^a$. In the grooves $19^a$ and $20^a$ is a series of balls 22, and in the upper end of the member 18 is fixed an annular stop 23 having its under surface shaped to receive the uppermost balls of the series and thus limit the upward movement of the spindle when the lowermost ball is at the lower end of the groove $19^a$ in the spindle (Fig. 3). The groove $19^a$ is semicircular or substantially so in cross-section. The major portion of the cross-section of the groove $20^a$ also is formed on the arc of a circle, but the sides of the grooves flare (as indicated at $x$ in Fig. 4) so that the width of the groove $20^a$ is greater than the diameter of the balls.

The tubular member 18 is pivotally supported by the boss 17 through the medium of a tubular head 24 and a pair of links 25, the links being pivoted as by means of pins 26 and bolts 27 to the boss 17 and head 24, respectively. The member 18 is rigidly secured at its lower end to the head as by means of a screw-thread connection therewith, and the opening in the boss, through which the member 18 extends, is enlarged to permit of a swinging movement of the member therein. If desired, a set screw $18^a$ may be entered between the member 18 and bushing 20 to lock them against relative movement.

Upon its upper end the spindle comprises a cylindrical portion 28 and a polygonal portion 29. The cylindrical portion is adapted to receive an actuating wheel 30 (Fig. 1), while the polygonal portion is adapted to receive a hand lever 31 (Fig. 3).

On the disk 3 is an arm 32, the outer end of which underlies the boss 17. In an opening 33 in the outer end of the arm 32 a block 34 is secured as by a pin 35. Said block has an upper disk portion 36 having an opening 37 therein, and the block 34 has a socket 38 alined with the opening 37. Said opening is made of a size sufficient to pass a ball stud 39 on the lower end of the spindle 19, while the socket 38 is adapted to neatly receive said stud. For retaining the stud in its socket, a pair of balls 40 are provided. These balls operate in transverse openings 41 formed in the disk portion 36 of the block, being held in bearing engagement with the upper surface of the stud by screws 42 provided with lock nuts 43.

Assuming the parts to be in the position shown in Fig. 1, the operation is as follows: The article to be sheared is inserted into the proper openings 6, or is placed between the shear blades 12 and 13. The hand wheel 30 or lever 31 is then operated in the direction to turn the spindle 19 in the downward or pressure-applying direction. In this movement, the free end of the arm 32 travels in the arc of a circle, carrying with it the lower end of the spindle. The swinging movement thus imparted to the spindle is permitted by the pivotal mounting of the head 24 and thereby of the tubular member 18 and bushing 20, in the tubular boss 17. After the plate or bar has been sheared, the actuating device is operated in the reverse direction until the disk 3 has been restored to normal position.

In the rotation of the spindle, the series of balls 22 acts as a screw-thread, causing longitudinal movement of the spindle. It has been found that the peculiar form of the groove $20^a$ enables the balls to travel up and down without binding, thus obviating the necessity of using a ball spacer.

While I have described the present embodiment of the invention with considerable particularity, it will be understood that the invention is not limited to the precise construction shown, and that certain features of the invention are applicable to devices for punching metal sheets and bars.

I claim as my invention:

1. In a device of the class described, two members having a telescoping relation with each other, and balls engaging both members to provide the equivalent of a screw threaded connection between them, one of said members having a spiral groove receiving the balls in fitting engagement, the substantially circular cross section of the groove being relieved or cut away adjacent the edges of the groove.

2. In a device of the class described, a cylindrical element having a spiral groove in its surface, the cross sectional shape of said groove being substantially a semi-circle with the edges flared outwardly.

In testimony whereof, I have hereunto set my hand.

JOHN JENSEN.